United States Patent [19]

Kaiser

[11] Patent Number: 4,563,092
[45] Date of Patent: Jan. 7, 1986

[54] LASER ROTATION RATE SENSOR

[75] Inventor: Joachim Kaiser, Düsseldorf, Fed. Rep. of Germany

[73] Assignee: Teldix GmbH, Heidelberg, Fed. Rep. of Germany

[21] Appl. No.: 453,157

[22] Filed: Dec. 27, 1982

[51] Int. Cl.[4] .............................................. G01C 19/64
[52] U.S. Cl. ...................................... 356/350; 350/377
[58] Field of Search ......................... 356/350; 372/94; 350/376, 377, 385, 394, 395

[56] References Cited

U.S. PATENT DOCUMENTS

| | | | |
|---|---|---|---|
| 3,545,866 | 12/1970 | Jacobs et al. | 356/350 |
| 3,626,394 | 12/1971 | Nelson et al. | 350/377 X |
| 3,636,535 | 1/1972 | Cushner et al. | 350/377 X |
| 3,649,931 | 3/1972 | Macek | 356/350 |
| 3,752,586 | 8/1973 | Hutchings et al. | 356/350 |
| 3,851,973 | 12/1974 | Macek | 356/350 |
| 4,195,908 | 4/1980 | Kestigian et al. | 356/350 |
| 4,225,239 | 9/1980 | Prinz | 356/350 |

FOREIGN PATENT DOCUMENTS 2432479  1/1976  Fed. Rep. of Germany .
2919590  11/1979 Fed. Rep. of Germany .
1464882  2/1977  United Kingdom .
2020842  11/1979 United Kingdom .

*Primary Examiner*—Vincent P. McGraw
*Attorney, Agent, or Firm*—Spencer & Frank

[57] ABSTRACT

The invention relates to a laser rotation rate sensor wherein two light beams counterrotate in a polygon equipped with reflectors at its corners, a signal being derived from their frequency difference in dependence on the rate of rotation. The rotation rate sensor comprises a reflector designed and operated as a magneto-optic element for the suppression of lock-in and including a prism whose base boundary face is disposed adjacent a layer of a gyrotropic material, the reflector being designed in such a manner that total reflection occurs. In the laser rotation rate sensor, the index of refraction of the gyrotropic material is approximately equal to or greater than that of the prism; a further layer of a dielectric material is disposed adjacent the gyrotropic layer, which further layer has a smaller index of refraction than the prism material and the material of the gyrotropic layer, in such a manner that total reflection occurs at the interface between the layer of gyrotropic material and the further layer.

4 Claims, 3 Drawing Figures

LASER ROTATION RATE SENSOR

BACKGROUND OF THE INVENTION

The invention relates to a laser rotation rate sensor in which two light beams counterrotate in a polygon equipped with reflectors in its corners, a signal being derived from their frequency difference which depends on the rate of rotation. The sensor comprises a reflector designed and operated as a magnetooptic element so as to suppress lock-in and includes a prism whose base boundary line borders onto a layer of a gyrotropic material, the reflector being designed in such a manner that total reflection occurs.

It is known that laser rotation rate sensors can be used to measure inertial rotation rates in that the difference in frequency between counterpropagating electromagnetic waves is determined. It is further known that this frequency difference disappears at input rotation rates below a certain threshold value and that thus the rotation rate sensor loses its ability to measure low rotation rates. This phenomenon is called the lock-in effect. To avoid the lock-in effect, various measures have been developed which, in principle, are all based on the fact that a zero frequency split is forced onto the ring laser or—in other words—that its operating point is placed at a point outside the lock-in band.

One of these measures is the use of the magnetooptic Kerr effect. In this case, a nonreciprocal (i.e. direction dependent) phase shift is forced onto the light when it is reflected at the interface between two media of which at least one must be gyrotropic.

Thus, a phase shift difference is generated between the counterpropagating waves of such a rotation rate sensor and this phase shift difference leads to the abovementioned desired zero frequency split according to the following equation:

$$\Delta\nu = (\Delta\phi/2\pi) \cdot (c/L)$$

where
- $\Delta\nu$ = the frequency difference;
- $\Delta\phi$ = the phase shift difference:
- c = the speed of light;
- L = the length of the rotational path.

A corresponding arrangement is known from U.S. Pat. No. 4,225,239. In that patent, a magneto-optic metal mirror is inserted in the beam path in addition to the conventional corner mirrors and the beams impinge on that mirror in a grazing manner.

Such mirrors, however, have the drawback of having an insufficient reflection capability. A solution has been prepared in copending application Ser. No. 468,059 filed Feb. 9, 1983 which describes a rotation rate sensor in which total reflection is utilized. This proposed solution will be described with the aid of FIG. 1.

The laser rotation rate sensor shown in FIG. 1 includes an optical amplifier 1, a mirror 2, a partially transmissive mirror 3, a further mirror 4, a beam divider 4a, a reflector 5 and an optical detector 7 for measuring the frequency difference of the waves. The counterrotating laser beams are designated 8 and 9. Reflectors 2, 3 and 5 are designed and arranged in such a manner that the illustrated rotary paths are created. Beam 9 is reflected at mirror 2, partially reflected by mirror 3 and the remaining portion of the beam is returned by reflector 5 to optical amplifier 1. The portion passing through mirror 3 reaches detector 7.

Beam 8 is deflected in reflector 5, is partially deflected to mirror 2 by the partially transmissive mirror 3 and is returned from mirror 2 to the optical amplifier. The portion passing through the partially transmissive mirror is directed by mirror 4 onto beam divider 4a and a part thereof is likewise deflected toward detector 7.

In order to suppress the lock-in effect, reflector 5 is designed in a special manner. It includes a prism 5a having a certain index of refraction $n_1$; the lateral faces 5b of the prism are inclined in such a manner that, due to meeting the Brewster condition, the generated polarized beams (8 or 9, respectively) are not reflected. A layer 5c of a gyrotropic material is applied to the base face 5d of the prism; this material has an index of refraction $n_2$ which is less than that of the material of the prism 5a. Thus, with an angle of incidence of appropriate size (not shown here) there will occur total reflection of the beams at the interface 5d between prism 5a and layer 5c. Since, moreover, as a consequence of the applied magnetic field perpendicular to the plane of the drawing and not shown, there occurs a Kerr effect, the beams (9 and 8) experience different shifts in phase. This makes it possible to sense even low rotational rates of the arrangement.

The requirement that a gyrotropic material be used which has an index of refraction that is much smaller than that of the prism material, considerably limits the number of usable substances, since generally most gyrotropic substances have a high index of refraction. This makes difficult, to say the least, the location of a substance that additionally has the greatest possible Faraday rotation and the lowest possible absorption.

It is therefore the object of the invention to modify the proposed arrangement to the extent that the requirement for a certain index of refraction of the gyrotropic material is eliminated and the gyrotropic material can be selected primarily with regard to the other requirements.

SUMMARY OF THE INVENTION

The invention is a laser rotation rate sensor wherein two light beams counterrotate in a polygon equipped with reflectors at its corners. A signal is derived from the difference in the frequencies of the two light beams which depends on the rate of rotation. The rotation rate sensor comprises a magneto-optic reflector element for the suppression of lock-in and includes a prism whose base boundary face is disposed adjacent a layer of gyrotropic material.

The index of refraction of the gyrotropic material is approximately equal to or greater than that of the prism, and a further layer of a dielectric material is located adjacent the gyrotropic layer. The further layer has a smaller index of refraction than that of the prism material and also than that of the material of the gyrotropic layer. Total reflection occurs at the interface between the layer of gyrotropic material and the layer of dielectric material.

In this arrangement as well, it is appropriate to design the coupling prism in such a manner that the Brewster condition applies for the beams coupled in at the lateral faces of the prism so that almost no reflection takes place there.

DESCRIPTION OF THE PREFERRED EMBODIMENTS

Figure 1:
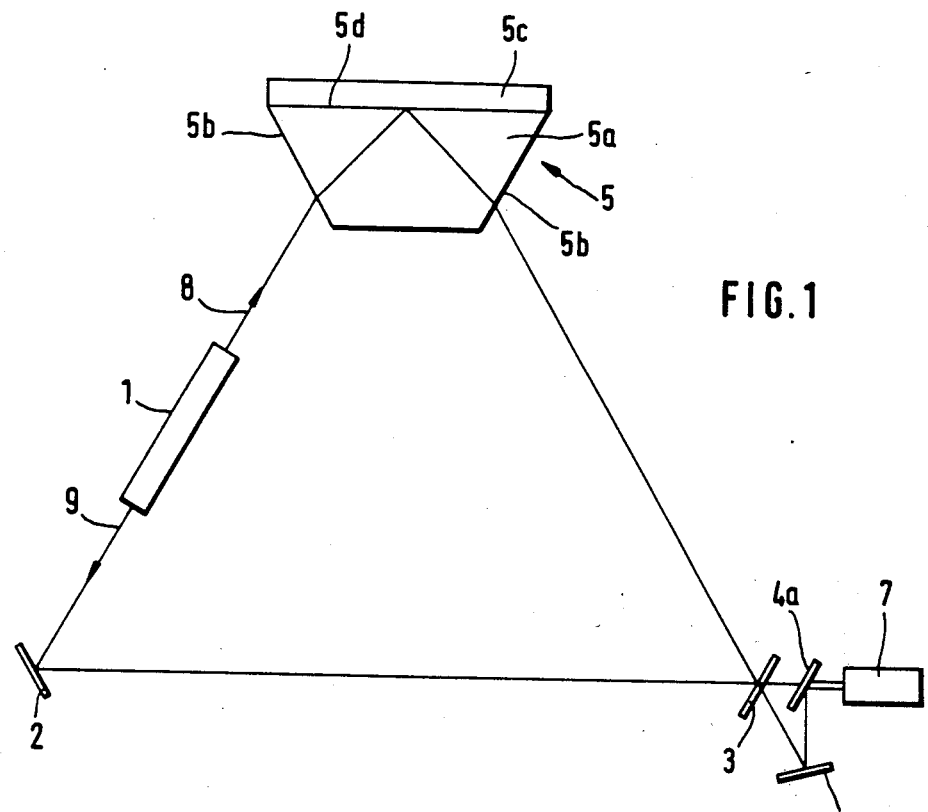
FIG. 1 shows a prior art device which has been described above.
Figure 2:
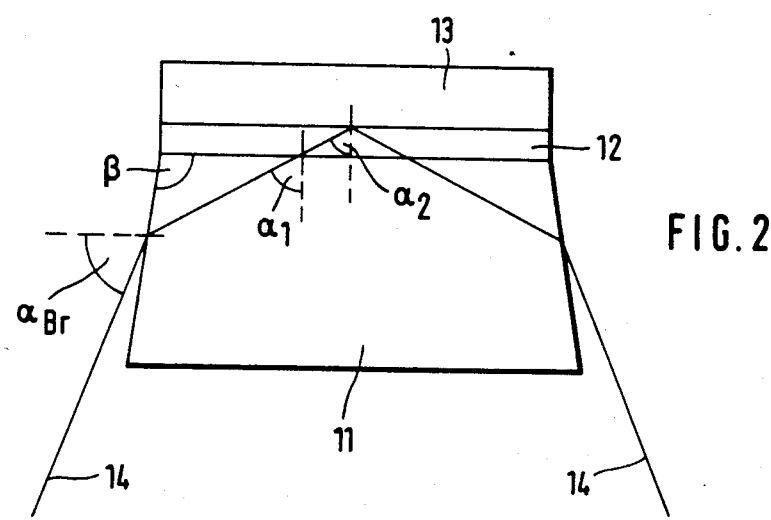
FIG. 2 depicts a reflector according to the invention.

FIG. 2 shows only a reflector designed according to the invention which replaces reflector 5 of FIG. 1. This reflector includes the coupling prism 11 of dielectric material (index of refraction $n_1$) having its sides at an angle with the horizontal gyrotropic layer 12 (index of refraction $n_2$) applied thereonto, and an additional dielectric layer 13 (index of refraction $n_3$).

The laser beams 14 impinge on the lateral faces of the coupling prism 11 at the Brewster angle $\alpha_{Br}$ and, due to the greater density ($n_1$) of the prism material, are refracted toward the perpendicular. They impinge on layer 12 at the angle $\alpha_1$ and, since the index of refraction ($n_2$) of the gyrotropic material is greater there, are refracted again toward the perpendicular. Thereafter, they impinge on layer 13 at the angle $\alpha_2$ and, since the material of this dielectric layer has a clearly smaller index of refraction ($n_3$) (e.g. close to 1.0), total reflection occurs at the interface between layers 12 and 13. The magnetization of layer 12 produces a nonreciprocal phase influence on the counterpropagating waves and thus the desired phase shift difference.

An index of refraction of close to one is given above for the dielectric layer. It should be noted in this connection that layer 13 may also be ambient air or an ambient vacuum for which the condition of the index of refraction being close to one or equal to one applies. However, a distinct layer of a solid dielectric material may also be utilized. The thickness of layer 12 of gyrotropic material must be selected in such a manner that the transmitted wave interferes with the light reflected at the boundary face. For optimization, care must be taken that the absorption losses of reflector 5 increase monotonically with the thickness $d_2$ of layer 12 and the resulting phase shift difference in the thickness $d_2$ of layer 12 is periodic.

The following values apply to the above-mentioned angles and refraction indices:

$\alpha_{Br} = \arctan n_1$ $\beta = \alpha_0 + \alpha_{Br}$ $2\alpha_0$ = beam deflection angle effected by reflector 5 (e.g. 60°)

$\alpha_1 = \beta - \arcsin(\sin \alpha_{Br}/n_1)$ $\alpha_2 = \arcsin(n_1 \sin \alpha_1/n_2)$ $n_3 < n_1 \cdot \sin \alpha_1$

I claim:

1. A laser rotation rate sensor wherein two light beams counterrotate in a polygon equipped with reflectors in its corners, a signal being derived from their frequency difference which depends on the rate of rotation, said rotation rate sensor comprising a reflector having a magneto-optic element for the suppression of lock-in and including a prism whose base boundary face is disposed adjacent a layer of a gyrotropic material, characterized in that the index of refraction of the gyrotropic material is approximately equal to or greater than that of the prism; a further layer of a dielectric material is disposed adjacent the gyrotropic layer, said further layer having a smaller index of refraction than that of the prism material and that of the material of the gyrotropic layer, in such a manner that total reflection occurs at the interface between the layer of gyrotropic material and the further layer.

2. A laser rotation rate sensor according to claim 1, characterized in that, due to adherence to the Brewster condition, almost no reflection occurs when light enters at its two lateral faces.

3. A laser rotation rate sensor according to claim 1 or 2, characterized in that the further layer is the ambient air or a vacuum environment.

4. A laser rotation rate sensor, comprising:
    an optical amplifier having first and second opposite ends for emitting first and second beams of light, said first and second beams of light travelling in opposite directions around a closed optical path;
    an optical detector;
    a magneto-optic reflector positioned in the path of said first laser beam, said reflector including
        a coupling prism having an index of refraction $n_1$, said coupling prism having at least first and second surfaces with an angle $\beta$ therebetween;
        a gyrotropic layer having first and second opposing surfaces, said first surface being affixed to the second surface of said coupling prism, the index of refraction $n_2$ of said gyrotropic layer being equal to or greater than $n_1$; and
        a single dielectric layer having a surface affixed to the second surface of said gyrotropic layer, the index of refraction $n_3$ of said dieletric layer being less than $n_1$ or $n_2$, said first laser beam inpinging at the Brewster angle on the first surface of said coupling prism, being totally reflected at the interface between said gyrotropic layer and said dielectric layer and being emitted as a single output beam from said reflector, and
    optical means transmitting the output beam from said reflector and said second laser beam to said optical detector, the output of said optical detector corresponding to the difference in frequency between said first and second beams of light.

* * * * *